United States Patent
Wilson et al.

(10) Patent No.: US 10,178,111 B1
(45) Date of Patent: Jan. 8, 2019

(54) PROVIDING COMPRESSED RISK ASSESSMENT MESSAGES FOR REAL-TIME TRANSMISSION VIA DATA NETWORKS TO ONLINE SERVICES

(71) Applicant: EQUIFAX INC., Atlanta, GA (US)

(72) Inventors: John Wilson, Milton, GA (US); Kevin D. Leslie, Lambertville, NJ (US); Kristina Barronton, Alpharetta, GA (US); Gregory Marholin, Brentwood, NH (US)

(73) Assignee: Equifax Inc., Atlanta, GA (US)

( * ) Notice: Subject to any disclaimer, the term of this patent is extended or adjusted under 35 U.S.C. 154(b) by 212 days.

(21) Appl. No.: 15/275,868

(22) Filed: Sep. 26, 2016

Related U.S. Application Data

(60) Provisional application No. 62/232,060, filed on Sep. 24, 2015.

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
See application file for complete search history.

(56) References Cited

U.S. PATENT DOCUMENTS

| 7,509,285 | B1 * | 3/2009 | Maniar | G06Q 20/3674 |
| | | | | 705/35 |
| 2003/0093302 | A1 * | 5/2003 | Quido | G06Q 40/02 |
| | | | | 705/4 |
| 2008/0021803 | A1 * | 1/2008 | Ahles | G06Q 20/04 |
| | | | | 705/35 |
| 2010/0198631 | A1 * | 8/2010 | Edwards | G06Q 10/00 |
| | | | | 705/7.28 |
| 2012/0278108 | A1 * | 11/2012 | Gaughan | G06Q 10/10 |
| | | | | 705/4 |

(Continued)

OTHER PUBLICATIONS

Kent et al., Credit Check, Dec. 2000, 7 pages.
Lankford, The New Math of Auto Coverage, Kiplinger's Personal Finance, Jun. 2007, 6 pages.

*Primary Examiner* — Ghodrat Jamshidi
(74) *Attorney, Agent, or Firm* — Kilpatrick Townsend & Stockton LLP

(57) ABSTRACT

Aspects and examples are disclosed for providing compressed risk assessment messages for real-time transmission to online services. For example, a request for a compressed risk assessment message about an entity is received from an online service. The compressed risk assessment message is generated by executing a risk assessment algorithm with at least some data about the entity. The compressed risk assessment message indicates a risk associated with the entity. The risk is indicated using less data than a detailed risk assessment generated by the risk assessment system, which may include an explanation indicating how the risk is determined. The compressed risk assessment message is transmitted to an online service that requests the compressed risk assessment. In some aspects, a detailed risk assessment is generating using the risk assessment algorithm, and, subsequent to transmitting the compressed risk assessment message, is transmitted to the online service.

17 Claims, 5 Drawing Sheets

(56) References Cited

U.S. PATENT DOCUMENTS

| | | | | |
|---|---|---|---|---|
| 2015/0142700 A1* | 5/2015 | Best | .................. | G06N 5/04 |
| | | | | 706/11 |
| 2015/0381621 A1* | 12/2015 | Innes | .................. | G06F 21/31 |
| | | | | 726/7 |
| 2016/0104163 A1* | 4/2016 | Aquino | .................. | G06Q 20/4016 |
| | | | | 705/44 |
| 2016/0359894 A1* | 12/2016 | Andrejko | .................. | G06F 17/241 |

* cited by examiner

PROVIDING COMPRESSED RISK ASSESSMENT MESSAGES FOR REAL-TIME TRANSMISSION VIA DATA NETWORKS TO ONLINE SERVICES

CROSS-REFERENCE TO RELATED APPLICATIONS

This disclosure claims priority to U.S. Provisional Application No. 62/232,060, entitled "Generating Risk Assessment Indicators for Real-Time Transmission via Data Networks to Online Providers of Products and Services," filed Sep. 24, 2015, the entirety of which is hereby incorporated by reference herein.

TECHNICAL FIELD

This disclosure relates generally to controlling data transfers between computers or digital data processing systems and otherwise enabling collaborative processing of data by the computers or digital data processing systems, and more particularly relates to providing compressed risk assessment messages for real-time transmission to online services.

BACKGROUND

Certain computing systems implement risk assessment algorithms, which can include automated modeling algorithms (e.g., algorithms using modeling techniques such as logistic regression, neural networks, support vector machines, etc.) that can evaluate risks involved with initiating or otherwise participating in electronic transactions with entities over a data network. For example, a risk assessment system can use machine-learning algorithms to learn from and make predictions regarding electronic transactions having certain circumstances. The predictions can include assessments of risk associated with electronic transactions involving certain entities.

These risks can be used by online services that are used to exchange electronic content with entities or otherwise conduct electronic transactions involving computing devices corresponding to the entities. For example, an online service can operate in collaboration with a remote risk assessment system when engaging in electronic transactions involving a given entity. The collaboration can involve the risk assessment system providing a risk assessment with respect to the entity and the online service modifying one or more actions taken in response to requests from the entity, where the requests are received via a communication session with the online service.

SUMMARY

Aspects and examples are disclosed for providing compressed risk assessment messages for real-time transmission to online services. For example, a request for a compressed risk assessment message about an entity is received from an online service. The compressed risk assessment message is generated by executing a risk assessment algorithm with at least some data about the entity. The compressed risk assessment message indicates a risk associated with the entity. The risk is indicated using less data than a detailed risk assessment generated by the risk assessment system, which may include an explanation indicating how the risk is determined. The compressed risk assessment message is transmitted to an online service that requests the compressed risk assessment. In some aspects, a detailed risk assessment is generating using the risk assessment algorithm, and, subsequent to transmitting the compressed risk assessment message, is transmitted to the online service.

This illustrative example is mentioned not to limit or define the invention, but to aid understanding thereof. Other aspects, advantages, and features will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
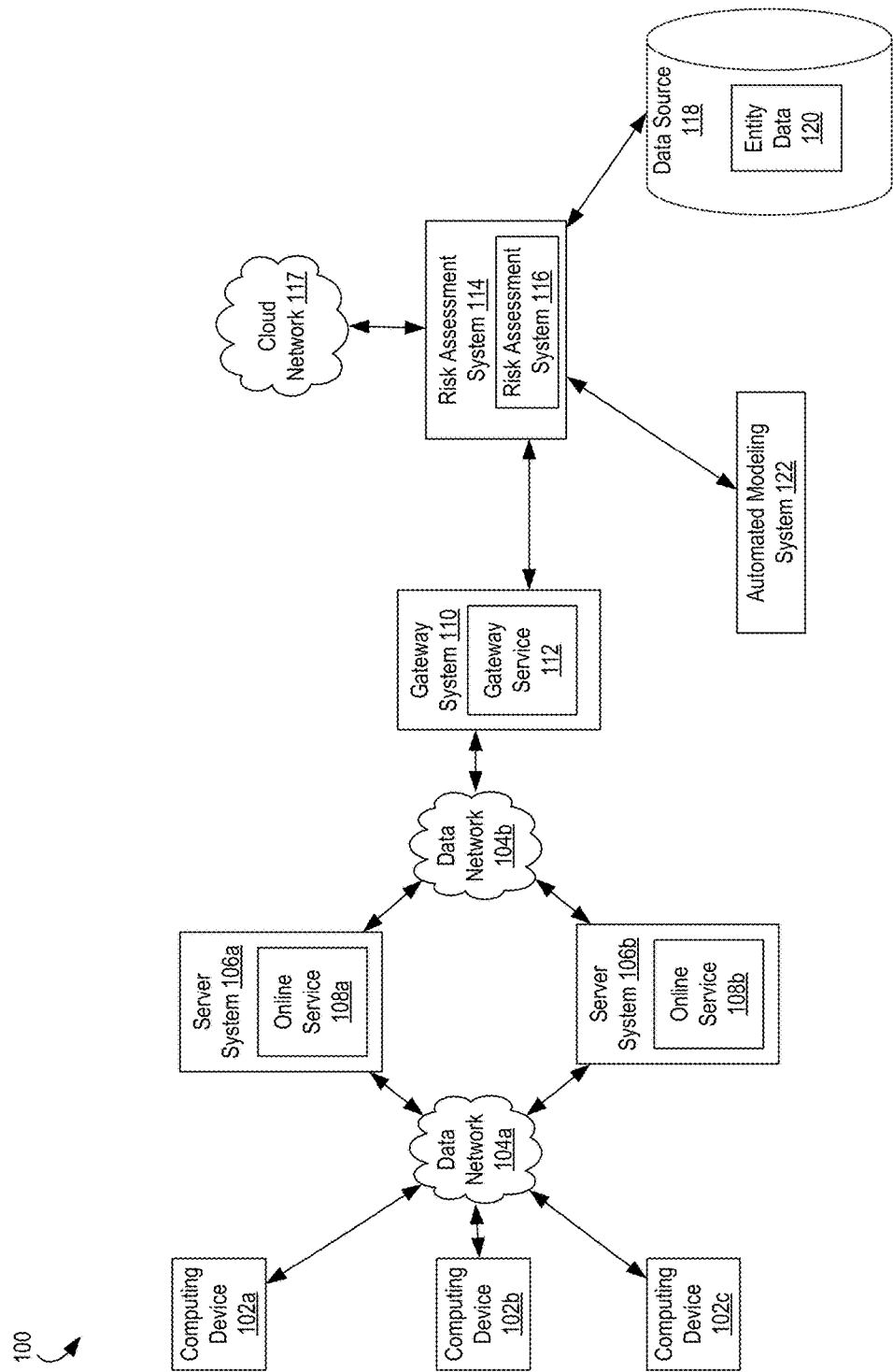
FIG. 1 depicts an example of a computing system that can generate compressed risk assessment messages for real-time transmission to online services, according to some aspects of the present disclosure.

Certain aspects of this disclosure describe a risk assessment system that can rapidly provide compressed risk assessment messages for real-time transmission via data networks to online services used for electronic transactions among entities. In certain aspects, the risk assessment system can include one or more processing devices that access multiple data sources having information about an individual (or other entity). The risk assessment system can execute one or more risk-assessment algorithms using the accessed data sets to generate a compressed risk assessment message for the individual. The risk assessment system can transmit the generated, compressed risk assessment messages via a data network to an online service that is in communication with the individual. For example, the risk assessment system can transmit the compressed risk assessment message to one or more servers or other computing systems that host the online service or are otherwise associated with the online service.

The risk assessment message uses less data to indicate a risk associated with an individual as compared to a detailed risk assessment. For instance, examples of a compressed risk assessment message include a numerical ranking, a letter grade, or some other concise indicator of a level of risk associated with the assessed entity. By contrast, a detailed risk assessment can include a detailed explanation of how a risk associated with an individual is determined. Thus, rather than providing an extensive amount of risk assessment data (e.g., the detailed risk assessment) to the online service, the risk assessment system transmits a compressed (i.e., concise) amount of risk assessment data that allows the online service to rapidly determine whether to initiate or continue a transaction involving the assessed individual or other entity.

In some aspects, the risk assessment system can generate and transmit a compressed risk assessment message in real time. For example, generating and transmitting a compressed risk assessment message in real time may involve generating and transmitting the risk assessment message during a communication session between the online service and a computing system associated with the assessed entity in which the online service identifies the entity's interest in a transaction and determines whether the online service should proceed with the transaction.

In some aspects, the risk assessment system can collaboratively process data in conjunction with online services and one or more gateway systems. For example, a collaborative computing system may include a risk assessment system, one or more online services, and a gateway system that enables communication between the risk assessment system and the online services. The gateway system can format and coordinate data transfers between the risk assessment system and the online services. The risk assessment system can provide compressed risk assessment messages and, in some cases, detailed risk assessments to the online service via the gateway system. The online service can process data received via a session with an entity and provide access to certain online content, certain products, certain subscription-based services, or some combination thereof. In combination, the risk assessment system, the online service, and the gateway system can assess risks associated with certain entities and control what content, products, or services are provided to the entities as a result of the risk assessment.

In some aspects, the risk assessment system can provide improvements over existing computing systems that provide risk assessments for entities involved in electronic transactions with online services. For example, the compressed risk assessment message can be generated by executing the same risk-assessment algorithm as a more detailed risk assessment for the individual or other entity. But transmitting a compressed risk assessment message involves a smaller amount of data (e.g., a numerical score rather than a detailed report) than the detailed risk assessment, while still providing the same or similar level of accuracy regarding the assessed individual. In some cases, the compressed risk assessment message can cause the online service to terminate an electronic transaction with an entity, thereby reducing or eliminating the need to communicate more extensive data in a detailed risk assessment via a data network or perform other communication operations via the data network. Thus, a risk assessment system according to some aspects can efficiently utilize relevant network resources when allowing online services (or users of online services) to make decisions about transactions that depend on a level of risk associated with certain individuals or entities.

Referring now to the drawings, FIG. 1 depicts an example of a computing system 100 that can generate compressed risk assessment messages for real-time transmission via data networks to online services used for electronic transactions among entities. FIG. 1 depicts examples of hardware components of the computing system 100 according to some aspects. The computing system 100 is a specialized computing system that may be used for processing large amounts of data using a large number of computer processing cycles.

The computing system 100 includes a risk assessment system 114. The risk assessment system 114 may be a specialized computer or other machine that processes the data received within the computing system 100. The risk assessment system 114 may include one or more other systems. For example, the risk assessment system 114 may include a database system for accessing network-attached data stores, a communications grid, or both. A communications grid may be a grid-based computing system for processing large amounts of data.

The computing system 100 may also include one or more network-attached data stores for storing a data source 118, which may be a database or other suitable attribute data structure. In some aspects, entity data 120 (or other input data) stored in the data source 118 includes a set of attribute values for multiple entities. Each data item in the entity data 120 indicates one or more attribute values and an entity associated with the attribute value. Network-attached data stores can include memory devices for storing entity data 120 to be processed by the risk assessment system 114. (In some aspects, the network-attached data stores can also store any intermediate or final data generated by one or more components of the computing system 100.) Although a database is described herein as an example of a data structure for storing the entity data 120, the risk assessment system 114 may be used to modify any data structure suitable for storing entity data 120 that is grouped into attributes.

The entity data 120 can be provided by one or more computing devices 102a-c, generated by computing devices 102a-c, or otherwise received by the computing system 100 via one or more data networks 104a, 104b. In some aspects, the entity data 120 can be data that is retrieved from proprietary data repositories.

In one example, the entity data 120 is generated by electronic transactions involving individuals or other entities. A large number of observations can be generated by electronic transactions. A given observation can include one or more attributes (or data from which an attribute can be computed or otherwise derived). The observation can also include data for one or more response variables (e.g., predictive output variables) or data from which a response variable value can be computed or otherwise derived.

Network-attached data stores used in the computing system 100 may also store a variety of different types of data organized in a variety of different ways and from a variety of different sources. For example, network-attached data stores may include storage other than primary storage, which is located within the risk assessment system 114 and directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The risk assessment system 114 can include one or more processing devices that execute program code. The program code, which is stored on a non-transitory computer-readable medium, can include the risk assessment application 116. The risk assessment application 116 can generate one or more compressed risk assessment messages, either directly or by communicating with an automated modeling system 122. Examples of an automated modeling system 122 include a mainframe computer, a grid computing system, or other computing system that executes an automated modeling algorithm (e.g., an algorithm using logistic regression, neural networks, etc.) that can learn or otherwise identify relationships between attributes and response variables (e.g., predictive output variables). The risk assessment system 114 may route select communications or data to the automated modeling systems 128 or one or more servers within the automated modeling systems 128.

Automated modeling systems 128 can be configured to provide information in a predetermined manner. For example, automated modeling systems 128 may access data to transmit in response to a communication. Different automated modeling systems 128 may be separately housed from each other device within the computing system 100, such as risk assessment system 114, or may be part of a device or system. Automated modeling systems 128 may host a variety of different types of data processing as part of the computing system 100. Automated modeling systems 128 may receive a variety of different data from the computing devices 102a-c, from the risk assessment system 114, from cloud network 117, or from other sources.

The computing system 100 can also include one or more computing devices 102a-c. The computing devices 102a-c may include client devices that can communicate with the risk assessment system 114. For example, the computing devices 102a-c may send data to the risk assessment system 114 to be processed, may send signals to the risk assessment system 114 to control different aspects of the computing environment or the data it is processing. The computing devices 102a-c may interact with the risk assessment system 114 via one or more data networks 104a, 104b.

The computing devices 102a-c may include network computers, sensors, databases, or other devices that may transmit or otherwise provide data to risk assessment system 114. For example, the computing devices 102a-c may include local area network devices, such as routers, hubs, switches, or other computer networking devices.

The computing system 100 may also include one or more server systems 106a, 106b that execute online services 108a, 108b. The server systems 106a, 106b may be external to a network or other collaborative computing environment that includes the risk assessment system 114. Examples of online services 108a, 108b include web-based systems for providing content to end users over data networks. For instance, an online service can be used to exchange electronic content involving electronic transactions (e.g., a purchase of goods or services). The online services 108a, 108b can be accessed by the computing devices 102a-c via one or more data networks 104a, 104b.

An example of an online service is a provider of goods or services. The online service may wish to provide fast, accurate quotes to potential customers. For example, the online service may communicate with clients via a comparative rate quoting website, which provides an interface used by customer systems to obtain quotes for goods or services. The comparative rate quoting website may simultaneously communicate with multiple providers of goods or services and thereby provide comparative quotes on a given good or service to a customer.

The computing system 100 may also include one or more gateway systems 110 that execute one or more gateway services 112. In some aspects, the gateway system 110 can include one or more servers that provide an interface for external server systems to communicate with the risk assessment system 114 over one or more data networks. In some aspects, the gateway system 110 may be external to a network or other collaborative computing environment that includes the risk assessment system 114. In additional or alternative aspects, the gateway system 110 may be part of a network or other collaborative computing environment that includes the risk assessment system 114.

In some aspects, the computing system 100 may also include one or more cloud networks 117. A cloud network 117 may include a cloud infrastructure system that provides cloud services. In certain examples, services provided by the cloud network 117 may include a host of services that are made available to users of the cloud infrastructure system on demand. A cloud network 117 is shown in FIG. 1 as being connected to risk assessment system 114 (and therefore having risk assessment system 114 as its client or user), but cloud network 117 may be connected to or utilized by any of the devices in FIG. 1. Services provided by the cloud network 117 can dynamically scale to meet the needs of its users. The cloud network 117 may include one or more computers, servers, or systems. In some aspects, one or more end-user devices can access the risk assessment system 114, network-attached data stores included in the computing system 100, the automated modeling system 122, or some combination thereof via the cloud network 117.

The numbers of devices depicted in FIG. 1 are provided for illustrative purposes. Different numbers of devices may be used. For example, while each device, server, and system in FIG. 1 is shown as a single device, multiple devices may instead be used.

Each communication within the computing system 100 (e.g., between client devices, between automated modeling systems 128 and risk assessment system 114, or between a server and a device) may occur over one or more data networks 104a, 104b. Data networks 104a, 104b may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data networks 104a, 104b. The data networks 104a, 104b can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

In some aspects, an automated modeling system 122 can perform one or more risk assessments or other analytical operations. Certain examples of risk assessments include identifying customers whose credit may be changing or remaining stable over time, assessing risks involved with a set of financial assets, etc. For instance, the automated modeling system 122 can be used to determine a probability of an individual or other entity exhibiting a type of future behavior. In a simplified example, the automated modeling system 122 can execute one or more algorithms for generating data indicative of a probability that an individual or other entity may default on a mortgage obligation, respond to a sales offer, etc.

Figure 2:
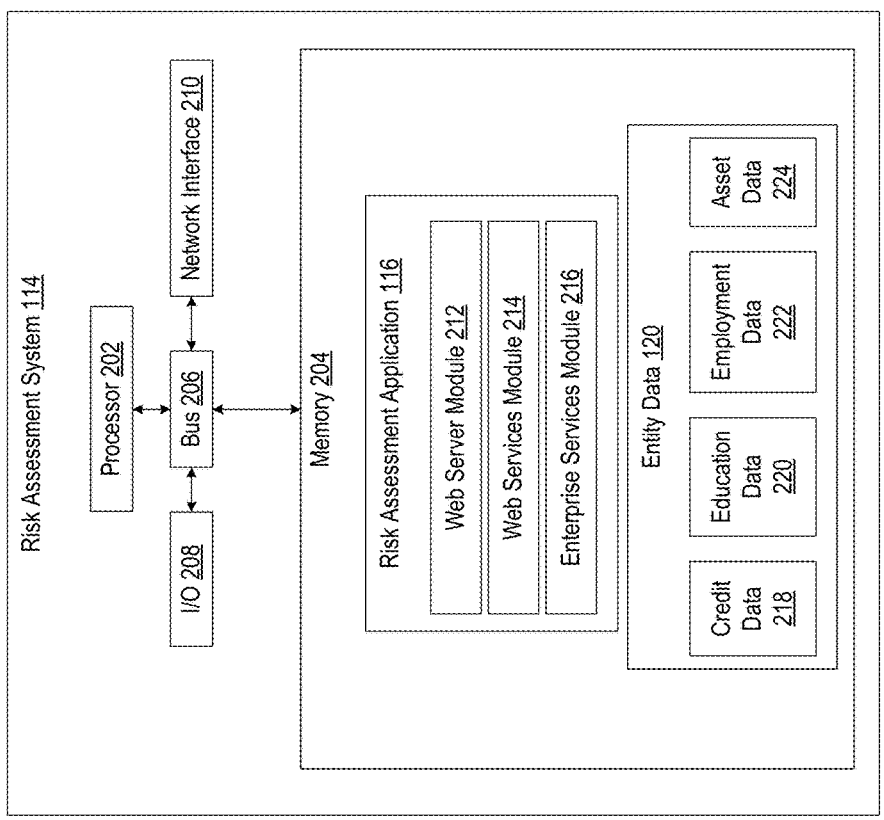
FIG. 2 depicts an example of a risk assessment system from the computing system of FIG. 1, according to some aspects of the present disclosure.

Any suitable computing system or group of computing systems can be used to perform the operations described herein with respect to risk assessments. For example, FIG. 2 is a block diagram depicting an example of a risk assessment system 114. The example of the risk assessment system 114 can include various devices for communicating with other devices in the computing system 100, as described with respect to FIG. 1. The risk assessment system 114 can include various devices for performing one or more of the operations described herein.

The risk assessment system 114 can include a processor 202 that is communicatively coupled to a memory 204. The processor 202 executes computer-executable program code stored in the memory 204, accesses information stored in the memory 204, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 202 include a microprocessor, an application-specific integrated circuit, a field-programmable gate array, or any other suitable processing device. The processor 202 can include any number of processing devices, including one. The processor 202 can include or communicate with a memory 204. The memory 204 stores program code that, when executed by the processor 202, causes the processor to perform the operations described in this disclosure.

The memory 204 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The risk assessment system 114 may also include a number of external or internal devices such as input or output devices. For example, the risk assessment system 114 is shown with an input/output interface 208 that can receive input from input devices or provide output to output devices. A bus 206 can also be included in the risk assessment system 114. The bus 206 can communicatively couple one or more components of the risk assessment system 114.

The risk assessment system 114 can execute program code that includes the risk assessment application 116. The program code for the risk assessment application 116 may be resident in any suitable computer-readable medium and may be executed on any suitable processing device. For example, as depicted in FIG. 2, the program code for the risk assessment application 116 can reside in the memory 204 at the risk assessment system 114. Executing the risk assessment application 116 can configure the processor 202 to perform the operations described herein.

In some aspects, program code stored in the memory can also include one or more of a web server module 212, a web services module 214, and an enterprise services module 216. For example, the web server module 212 can be executed by a processor 202 to provide one or more web pages or other interfaces to an external server system. The web pages or other interfaces can include content provided by the web services module 214. The web services module 214 can generate this content by executing one or more analytical algorithms using information retrieved from the entity data 120. The enterprise services module 216 can be executed to retrieve information from the entity data 120 and execute one or more algorithms for generating risk assessments using the retrieved information. For illustrative purposes, FIG. 2 depicts the web server module 212, the web services module 214, and the enterprise services module 216 as different modules. However, other implementations are possible. For example, one or more software modules can perform one or more functions of the web server module 212, the web services module 214, and the enterprise services module 216.

The entity data 120 can include, for example, data stored in secure and credentialed databases managed by or otherwise accessible by the risk assessment system 114. Data sources used to store the entity data 120 can include internal databases or other data sources that are stored at or otherwise accessible to the risk assessment system. The data sources can also include external databases that are accessible to the risk assessment system 114 via external networks. Non-limiting examples of the entity data 120 include credit data 218, education data 220, employment data 222, asset data 224 (e.g., property records or data regarding other assets possessed by a client), and other data. Examples of other data include data from online services 108 (e.g., cable television companies, telecommunications operators, and utility providers) and other types of information about individuals or other entities.

In some aspects, the risk assessment system 114 can include one or more output devices. One example of an output device is the network interface device 210 depicted in FIG. 2. A network interface device 210 can include any device or group of devices suitable for establishing a wired or wireless data connection to one or more data networks 104*a*, 104*b*. Non-limiting examples of the network interface device 210 include an Ethernet network adapter, a modem, etc.

As described herein, the risk assessment system 114 depicted in FIGS. 1 and 2 can execute the risk assessment application 116 and thereby generate compressed risk assessment messages for real-time transmission via data networks to online services used for electronic transactions among entities. For instance, the risk assessment system 114 can receive, via one or more data networks 104*a*, 104*b*, a request to provide a risk assessment of a prospective customer or other entity. The risk assessment system 114 can receive the request from an external server system, such as one of the server systems 106*a*, 106*b*, which is associated with one of the online services 108*a*, 108*b* that may enter into a transaction with the customer. The risk assessment system 114 may communicate with any suitable type of online service. Examples of online services 108*a*, 108*b* that may communicate with the risk assessment system 114 include online services for insurance companies, insurance agencies, insurance aggregators, automobile merchants, mortgage providers, or other providers of goods or services that may use real-time risk assessments of customers or other entities to make decisions about electronic transactions involving the customers.

After a user of the online service decides to enter into the transaction with the prospective customer, the online service may request a more detailed risk assessment about the assessed entity (e.g., a prospective customer) from the risk assessment system 114. An example of a detailed risk assessment is a credit report with extensive descriptions of risks associated with the customer, adverse action codes for a customer, etc. The risk assessment system 114 can receive the request for the detailed risk assessment via one or more data networks 104*a*, 104*b* and provide the detailed risk assessment (e.g., a credit report and state specific approved score) in response to the request.

Figure 3:
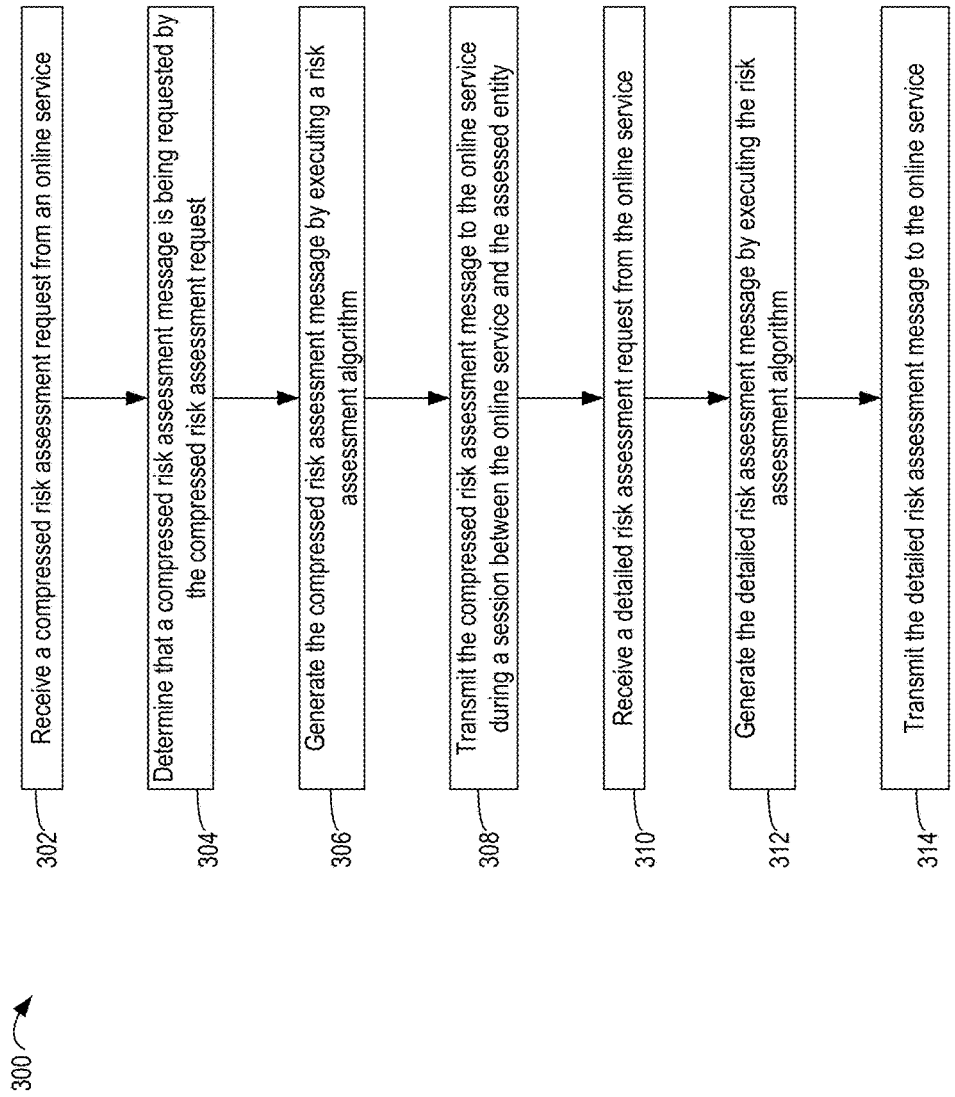
FIG. 3 depicts an example of a method for generating compressed risk assessment messages for real-time transmission, according to some aspects of the present disclosure.

FIG. 3 is a flow chart depicting an example of a method 300 for generating compressed risk assessment messages and detailed risk assessments. The method 300 can be implemented by one or more operations that are performed by the risk assessment application 116. For illustrative purposes, the method 300 is described with reference to the implementation depicted in FIGS. 1 and 2 and various other examples described herein. But other implementations are possible.

The method 300 can involve receiving a compressed risk assessment request from an online service, as depicted in block 302. For example, the risk assessment application 116 can be executed by one or more suitable processing devices to receive a compressed risk assessment request from an online service 108. The compressed risk assessment request can be included in a message that is received via one or more data networks 104*a*, 104*b*. For example, the risk assessment system 114 can receive the compressed risk assessment request via the network interface device 210.

The compressed risk assessment request can be generated during an online session established between a computing device associated with an entity and one or more server systems 106*a*, 106*b* that execute online services 108*a*, 108*b*. A session can include a period during which a computing device accesses services or applications via an online service, such as (but not limited to) the period that begins when a computing device connects to a server providing the online service and that ends when the computing device disconnects from the server.

In some aspects, the risk assessment application 116 can receive the compressed risk assessment request from a gateway service 112 that is executed by a gateway system 110. The gateway service 112 can be an intermediary service that receives the compressed risk assessment request from one or more online services 108*a*, 108*b*. In additional or alternative aspects, the risk assessment application 116 can receive the compressed risk assessment request without an intermediary. For example, the risk assessment application 116 can receive the compressed risk assessment request directly from one or more online services 108*a*, 108*b*.

The method 300 can also involve determining that a compressed risk assessment message is being requested by the compressed risk assessment request, as depicted in block 304. For example, the risk assessment application 116 can be executed by one or more suitable processing devices to determine that a compressed risk assessment message is required for responding to the compressed risk assessment request. In some aspects, if the compressed risk assessment request includes a specific function call, the risk assessment application 116 can determine that the compressed risk assessment message, rather than a detailed risk assessment, is required. This function call can include a parameter value or other data indicating that the online service needs a compressed risk assessment rather than a detailed risk assessment. The risk assessment application 116 can execute one or more operations for generating a compressed risk assessment message in response to determining that the compressed risk assessment request includes this function call and parameter value.

The method 300 can also involve generating the compressed risk assessment message by executing a risk assessment algorithm, as depicted in block 306. For example, the risk assessment application 116 can be executed by one or more suitable processing devices to perform the risk assessment algorithm and thereby generate the compressed risk assessment message. In some aspects, the risk assessment application 116 can transmit a request to the automated modeling system 122 to use a suitable risk assessment algorithm (e.g., an algorithm involving a logistic regression, a neural network, etc.) to generate some or all of a risk assessment.

In some aspects, the risk assessment algorithm includes one or more automated modeling algorithms using modeling techniques such as logistic regression, neural networks, support vector machines, etc. to assess a risk associated with an individual. An automated modeling algorithm is trained using large volumes of training data. This training data, which can be generated by or otherwise indicate certain electronic transactions or circumstances, is analyzed by one or more computing devices. The training data is grouped into attributes that are provided as inputs to the risk assessment algorithm that includes an automated modeling algorithm. The risk assessment algorithm can use this analysis to learn from and make predictions regarding similar electronic transactions or circumstances. For example, the risk assessment algorithm uses the attributes to learn how to generate a value of a response variable, such as a credit score or other predictive output indicating the likelihood of an entity engaging in a certain behavior, based on a context involving transactions or other circumstances similar to attributes from the training data (e.g., a context in which an entity having a certain amount of credit utilization, credit limits, outstanding debts, etc. is determined to be a high or low risk for defaulting on an obligation).

In some aspects, the compressed risk assessment message includes one or more of a numerical score or a letter grade. Examples of the compressed risk assessment message include a prescreen score, grade, risk ranking, etc.

The method 300 can also involve transmitting the compressed risk assessment message to the online service 108, as depicted in block 308. For example, the risk assessment application 116 can be executed by one or more suitable processing devices, and can thereby configure the network interface device 210 to transmit the compressed risk assessment message to the online service 108. The risk assessment system 114 can transmit the compressed risk assessment message during a session between the online service 108 and the assessed entity.

The compressed risk assessment message can be transmitted via one or more data networks 104*a*, 104*b*. For example, the processor 202, when executed by the risk assessment application 116, can configure or otherwise cause the network interface device 210 to transmit the compressed risk assessment message.

In some aspects, the risk assessment system 114 can generate and transmit the compressed risk assessment message in real time. Real-time delivery can include, for example, providing the assessment during a specified time period (e.g., an hour, a day, etc.) in which the online service negotiates with the assessed entity (e.g., a customer of an online insurance provider). For example, an online service may wish to rapidly deliver an accurate quote to an assessed entity, both for the purpose of achieving a high degree of assessed entity response and conversion and for the purpose of meeting regulatory requirements in a regulated industry.

In some aspects, real-time delivery can be determined based on a session between an online service and an assessed entity. For example, the compressed risk assessment message can be generated and transmitted during an online session established between a computing device associated with an entity and one or more server systems 106a, 106b. The risk assessment system 114 can generate and transmit the compressed risk assessment message after a compressed risk assessment request was generated during the online session and prior to the completion of the online session.

In some aspects, the risk assessment application 116 can transmit the compressed risk assessment message to a gateway service 112 that is executed by a gateway system 110. The gateway service 112 can transmit the compressed risk assessment message to one or more online services 108a, 108b. In additional or alternative aspects, the risk assessment application 116 can transmit the compressed risk assessment message without an intermediary. For example, the risk assessment application 116 can transmit the compressed risk assessment message directly to one or more online services 108a, 108b without the compressed risk assessment message being routed via the gateway system 110.

In some aspects, the method 300 can also involve receiving a detailed risk assessment request from the online service, as depicted in block 310. For example, the risk assessment application 116 can be executed by one or more suitable processing devices to receive a detailed risk assessment request from the online service 108. The risk assessment system 114 can use the network interface device 210 to receive the detailed risk assessment request via one or more data networks.

The detailed risk assessment request can be included in a message that is received via one or more data networks 104a, 104b subsequent to the risk assessment system 114 receiving a compressed risk assessment request. In some aspects, the detailed risk assessment request can be generated during the same online session between the assessed entity and the online service in which a compressed risk assessment request was generated. In additional or alternative aspects, the detailed risk assessment request can be generated during an online session between the assessed entity and the online service that is different from the online session in which a compressed risk assessment request was generated.

In some aspects, the risk assessment application 116 can receive the detailed risk assessment request from a gateway service 112 that is executed by a gateway system 110. In additional or alternative aspects, the risk assessment application 116 can receive the detailed risk assessment request without an intermediary. For example, the risk assessment application 116 can receive the detailed risk assessment request directly from one or more online services 108a, 108b that are executed by external server systems 106a, 106b.

The method 300 can also involve generating the detailed risk assessment by executing a risk assessment algorithm, as depicted in block 312. For example, the risk assessment application 116 can be executed by one or more suitable processing devices to perform the risk assessment algorithm and thereby generate the detailed risk assessment. In some aspects, the same risk assessment algorithm is used to generate both the compressed risk assessment message and the detailed risk assessment.

In additional or alternative aspects, blocks 306 and 312 can be combined. For example, a common execution of the risk assessment algorithm can cause the risk assessment system 114 to generate and output both the compressed risk assessment message and the detailed risk assessment. In these aspects, the risk assessment application 116 can first transmit the compressed risk assessment message without transmitting the detailed risk assessment. For example, the risk assessment application 116 may not transmit the detailed risk assessment without receiving a separate request for the detailed risk assessment. The risk assessment application 116 can store the detailed risk assessment in the data source 118 or any other suitable non-transitory computer-readable medium. The risk assessment application 116 can subsequently receive a separate request for the detailed risk assessment. The risk assessment application 116 can respond to this subsequent request by retrieving the stored detailed risk assessment, which was generated in the same execution of the risk assessment algorithm that generated the compressed risk assessment message.

The method 300 can also involve transmitting the detailed risk assessment to the online service 108, as depicted in block 314. For example, the risk assessment application 116 can be executed by one or more suitable processing devices, and can thereby configure the network interface device 210 to transmit the detailed risk assessment to the online service 108. The compressed risk assessment message can be transmitted via one or more data networks 104a, 104b. For example, the processor 202, when executed by the risk assessment application 116, can configure or otherwise cause the network interface device 210 to transmit the compressed risk assessment message. If the detailed risk assessment was generated by a common execution of the risk assessment algorithm that also generated the compressed risk assessment message, the risk assessment application 116 can cause the network interface device 210 to transmit a detailed risk assessment that was previously stored and that has been retrieved from the data source 118.

In some aspects, the risk assessment system 114 can transmit the detailed risk assessment during the same online session between the assessed entity and the online service in which a compressed risk assessment request was generated. In additional or alternative aspects, the detailed risk assessment request can be transmitted during an additional online session between the assessed entity and the online service that is different from the online session in which a compressed risk assessment request was transmitted.

In some aspects, the risk assessment system 114 can generate or update different types of entity data 120 for an assessed entity based on whether a compressed risk assessment message has been requested or a detailed risk assessment has been requested. For example, the entity data 120 can include a first flag or other data type that stores data indicative of receiving a compressed risk assessment request for a given entity. The risk assessment system 114 can generate or update the first flag or data type based on performing one or more of the operations described above with respect to blocks 302-308 (e.g., receiving a compressed risk assessment request, generating the compressed risk assessment message, transmitting the compressed risk assessment message, etc.). The entity data 120 can also include a second flag or other data type that stores data indicative of receiving a detailed risk assessment request for a given entity. The risk assessment system 114 can generate or update the second flag or data type based on performing one or more of the operations described above with respect to blocks 310-314 (e.g., receiving a detailed risk assessment request, generating the detailed risk assessment, transmitting the detailed risk assessment, etc.).

In some aspects, the risk assessment system 114 can receive a query requesting information about risk assessment requests for a given entity. The risk assessment application 116 can access a data source 118 having entity data 120 for the entity. The entity data 120 can include one or more first flags or other data types indicating that the entity has been the subject of one or more compressed risk assessment requests. The entity data 120 can also include one or more second flags or other data types indicating that the entity has been the subject of one or more detailed risk assessment requests. The risk assessment application 116 can generate a responsive message for servicing the query. The responsive message can exclude the first flags indicating that the entity has been the subject of one or more compressed risk assessment requests. The responsive message can include the second flags indicating that the entity has been the subject of one or more detailed risk assessment requests. The risk assessment application 116 can configure the network interface device 210 to transmit the responsive message, which lacks information about compressed risk assessment requests, in response to the query.

In some aspects, blocks 310-314 can be omitted for certain entities. For example, the risk assessment application 116 can receive multiple compressed risk assessment requests for multiple entities. The risk assessment application 116 can execute blocks 302-308 for these compressed risk assessment requests. But, for some of the compressed risk assessment requests, a recipient online service may not proceed with a transaction involving the entity after receiving the compressed risk assessment message (e.g., if the compressed risk assessment message indicates a threshold level of risk). Thus, if multiple compressed risk assessment requests were received for multiple entities at a first point in time, detailed risk assessment requests will only be received for a subset of those entities at a second point in time (e.g., because the compressed risk assessment messages indicated a level of risk below a threshold level of risk).

Figure 4:
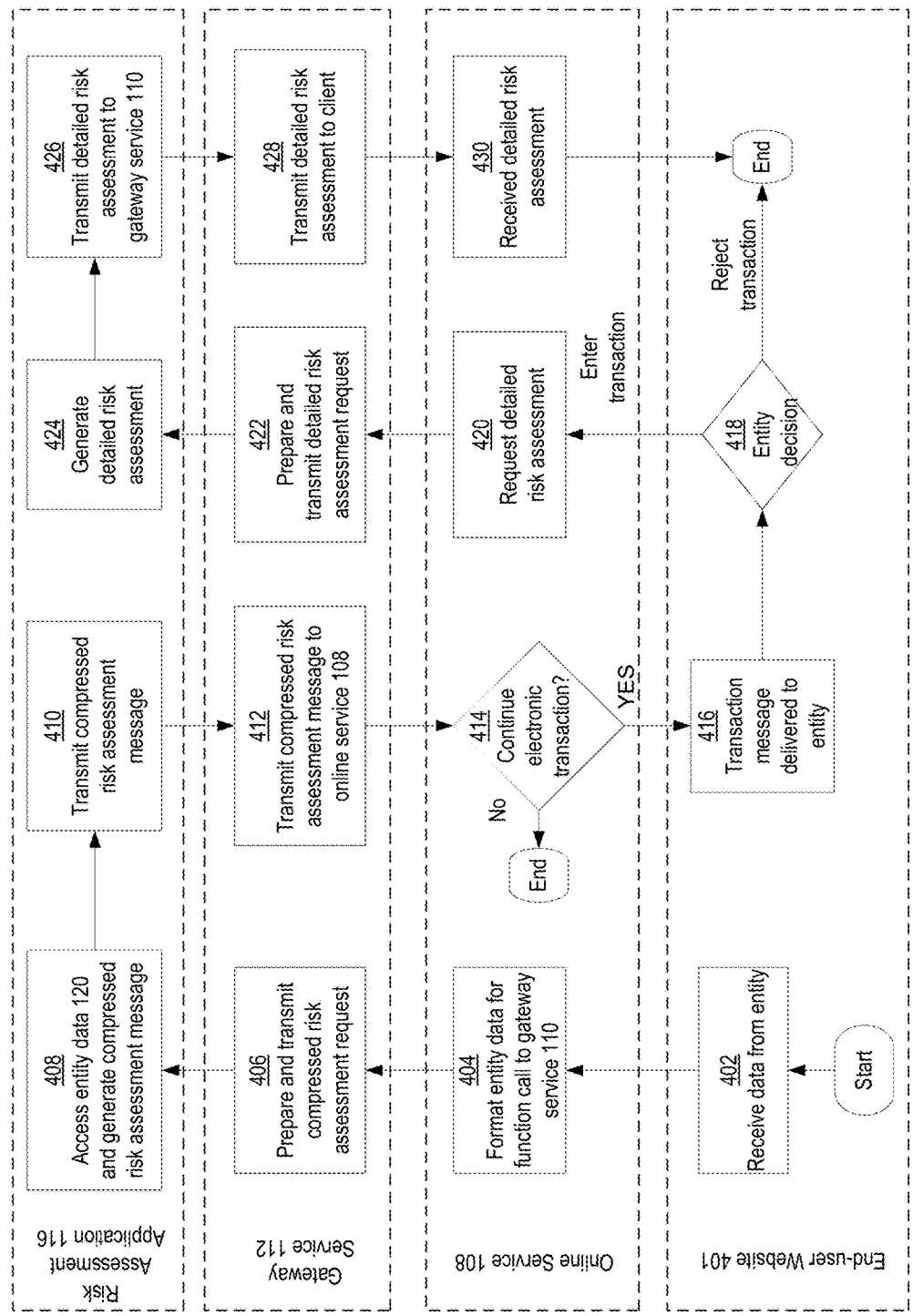
FIG. 4 depicts an example of a method that uses various devices depicted in FIG. 1 for communicating compressed risk assessment messages and detailed risk assessments, according to some aspects of the present disclosure.

FIG. 4 is a flow chart depicting an example of a method 400, in which various devices of the computing system 100 communicate compressed risk assessment messages and detailed risk assessments. For illustrative purposes, the method 400 is described with reference to the implementation depicted in FIGS. 1-3 and various other examples described herein. But other implementations are possible.

The method 400 can involve receiving data from the entity, as depicted in block 402. For example, an end-user website 401 (e.g., a comparative rate quoting website) can be hosted by one or more suitable processing devices and can receive data from an entity, such as a consumer wishing to enter an electronic transaction (e.g., a purchase of insurance or another product or service available from an online service 108). The entity can provide any suitable data that may be used by risk assessment application 116 to uniquely identify the entity. Examples of data that may be used by risk assessment application 116 to uniquely identify the entity include (but are not limited to) a social security number, a legal name, a mailing address, a phone number, an electronic address, or any combination thereof.

The method 400 can also involve formatting the received entity data for a function call to gateway service 112, as depicted in block 404. For example, an online service 108 (e.g., one of the online services 108a, 108b) can be executed by one or more suitable processing devices to format the received entity data. Formatting the received entity data can include tokenizing, cleaning, or otherwise converting the entity data from a format used by the end-user website 401 to a format used by the gateway service 112. In some aspects, the online service 108 can also encrypt personally identifiable information ("PII") or other sensitive data that may be received by the end-user website 401.

For example, an external server system used by an online service 108 may receive data from a customer via an end-user website 401, such as a comparative rate quoting website. Examples of data received from the customer via the comparative rate quoting website include (but are not limited to) identity-related information, information about a type of service or product desired by the customer, contact information, etc. The online service 108 can receive customer data via the comparative rate quoting website and format the data for transmission via the gateway service 112.

In some aspects, the online service 108 can identify an application programming interface used by the gateway service 112. The application programming interface used by the gateway service 112 can include one or more function calls for requesting a compressed risk assessment. The function call may require certain parameters. The online service 108 can generate the function call with parameter values that include the received entity data or that include parameter values that are derived from the received entity data.

The method 400 can also involve preparing and transmitting the compressed risk assessment request, as depicted in block 406. For example, the gateway service 112 can be executed by one or more suitable processing devices to prepare and transmit the compressed risk assessment request. In some aspects, the gateway service 112 can identify an application programming interface used by the risk assessment application 116. The application programming interface used by the risk assessment application 116 can include one or more function calls for generating a compressed risk assessment. The function call may require certain parameters. The online service 108 can generate the function call with parameter values that include entity data received from an online service 108 or that include parameter values that are derived from the received entity data. A request received by the risk assessment system 114 from an external server system can therefore contain information indicating that an online service is requesting a compressed risk assessment message for a customer or other entity.

The method 400 can also involve accessing entity data 120 and generating compressed risk assessment message, as depicted in block 408. For example, the risk assessment application 116 can be executed by one or more suitable processors 202 to access the entity data 120 and generate the compressed risk assessment message. The risk assessment application 116 can configure the processor 202 to access the entity data 106 from a data source 118 stored in a non-transitory computer-readable medium, such as the memory 204. The risk assessment application 116 can generate the compressed risk assessment message as described above with respect to block 306 of FIG. 3.

For example, if a potential customer requests a quote for a good or service on a comparative rate quoting website, the comparative rate quoting website's server can send a request to an online service 108. The request includes some details about the customer requesting a quote, as well as authorization to use the customer's personal information to generate a quote. The online service 108, which can be used by a subscriber or other client of the risk assessment system 114, can transmit a request via one or more data networks 104a, 104b to the risk assessment system 114 for compressed risk assessment message. The risk assessment system 114 can respond to the request by accessing a non-transitory computer-readable medium storing one or more data sources with data about the customer. The customer data can be used to assess risks about the customer.

One example of customer data used by the risk assessment system 114 includes data used by rating algorithms in the insurance industry. For example, in the insurance industry, inputs to a rating algorithm can include factors that indicate the customer's relative risk of filing insurance claims. These factors may include (but are not limited to) one or more of the customer's age, the customer's gender, the customer's marital status, where the customer lives, the customer's driving record, how many insurance claims the customer has previously filed, the type and amount of the insurance claims previously filed, what type of car the customer drives, and the customer's credit score. Other customer data can include credit data, employment data, etc.

The risk assessment system 114 can respond to receiving the request by executing one or more algorithms for generating the compressed risk assessment message that has been requested. The risk assessment system 114 can generate a compressed risk assessment message using the accessed customer data. The compressed risk assessment message can be generated from the same data sources that may be used to generate a more detailed risk assessment (e.g., a full credit report).

For example, if the external server system is used by an insurance provider seeking to sell an insurance policy to a customer, the risk assessment system 114 can process data describing the customer (e.g., the customer's credit information, etc.) to generate a compressed risk assessment message. The compressed risk assessment message can be generated using a scoring algorithm, or other risk assessment algorithm, that calculates the customer's relative claims risk. The risk assessment system 114 can transmit the compressed risk assessment message (e.g., a prescreen score, grade, or ranking calculated from the scoring algorithm) to the external server system via the gateway service 112 or directly via a suitable data network.

In some aspects, the compressed risk assessment message can include a rank or score for the customer. Examples of the compressed risk assessment message include a rank with a numerical designation (e.g., as 1 through 10), an alphabetical designation (e.g. "A" through "F"), a color indicator, a suggested operation, etc. A rank or score provided to an insurance online service may incorporate a Fair Isaac Insurance score or another generic or custom score. One example of a color indicator is an image, graphic, or textual data that includes or indicates a certain color, the color indicating a corresponding risk level (e.g., a red color indicating "high risk," an amber color indicating "medium risk," a green color indicating "low risk," and/or a color selected from some other set of colors corresponding to a set of respective risk levels).

A suggested operation can be a short string or other data that indicates an action corresponding to a respective risk level. In some aspects, the suggested operations can be computer-executable instructions. In other aspects, the suggested operations can be human-readable suggestions. In additional or alternative aspects, the suggested operations can be human-readable suggestions that can be presented to a user of an online service and, if selected, can cause the online service to perform responsive operations (e.g., terminating a session with an entity, continuing or initiating a transaction with an entity, etc.). Examples of suggested operations include "Submit to Underwriter," "Require Manual Application," etc. In some aspects, the risk assessment system 114 can communicate with a given online service to receive a data having a mapping of certain operations to certain risk levels. For instance, a set of suggested operations can be customized to a specific online service.

The rank, score, or other compressed risk assessment message that is generated for a customer may be customized for a given online service. For example, the risk assessment system 114 may access a non-transitory computer-readable medium with preference data for different client entities. Preference data for a first online service 108a may indicate that the first online service 108a prefers a ranking that indicates a relative level of risk for a given customer as compared to a specified pool of customers (e.g., customers having certain demographics). Preference data for a second online service 108b may indicate that the second online service 108b prefers an alphanumeric score from a set of scores specified by the client (e.g., scores indicating a high risk, a medium risk, a low risk). The risk assessment system 114 can generate the compressed risk assessment message for a given online service based on the available data relevant to risk (e.g., credit-related data). The risk assessment system 114 can format the compressed risk assessment message based on the preference data associated with the online service. The risk assessment system 114 may track the type of request from the client (e.g., whether the client is requesting the risk ranking or a full credit file) using different member numbers for the client. Other ways of tracking the request can also be envisioned, such as account numbers or client numbers.

In some aspects, the risk assessment system 114 can store data in a non-transitory computer-readable medium indicating that the compressed risk assessment message was generated for the customer. For example, the risk assessment system 114 may record a notice of a promotional or prescreen inquiry to the customer's credit file. The notice can be recorded using a first flag or other data type indicating a request for a compressed risk assessment message, as described above with respect to FIG. 3. The notice can include the name of the online service that requested the compressed risk assessment message.

The method 400 can also involve transmitting the compressed risk assessment message to the online service 108, as depicted in block 410. The risk assessment application 116 can transmit the compressed risk assessment message as described above with respect to block 308 of FIG. 3. For example, the risk assessment application 116 can be executed by one or more suitable processing devices and can thereby configure the network interface device 210 to transmit the compressed risk assessment message to the online service 108. The risk assessment system 114 can transmit the compressed risk assessment message during a session between the online service 108 and the assessed entity.

The method 400 can also involve transmitting the compressed risk assessment message to the online service 108, as depicted in block 412. For example, the gateway service 112 can be executed by one or more suitable processing devices of the gateway system 110, which can configure a network interface device of the gateway system 110 to transmit the compressed risk assessment message to the online service 108.

The method 400 can also involve determining whether to initiate or continue an electronic transaction after receiving the compressed risk assessment message, as depicted in block 414. For instance, the online service 108 can be executed by one or more suitable processing devices and can thereby determine, based on the compressed risk assessment message, whether a certain online transaction involving the entity should be initiated or continued.

In some aspects, the online service can automatically decide whether to initiate or continue an electronic transaction based on a threshold risk level. The threshold risk level can be formatted in a manner that can be compared to a compressed risk assessment message. If the compressed risk assessment message indicates a risk level greater than or equal to the threshold risk level, the online service can decide not to initiate or continue the electronic transaction. If the compressed risk assessment message indicates a risk level less than the threshold risk level, the online service can decide to initiate or continue the electronic transaction.

One example of continuing or initiating an electronic transaction involving an entity includes providing an insurance rate quote to a consumer via a comparative rate quote website or other suitable end-user website 401. The online service 108 can use the compressed risk assessment message to generate and transmit a quote (or other transaction message) to the comparative rate quoting website or other end-user website 401. For example, the online service 108 can execute one or more algorithms for processing a quote or other data related to a customer transaction based on the compressed risk assessment message and customer data, which may be received via the comparative rate quoting website. The online service 108 can transmit the quote or other decision data to the comparative rate quoting website via a suitable data network. The online service 108 may alternatively decide not to proceed with the quote if, for example, the compressed risk assessment message does not indicate an acceptable risk level.

If the online service 108 decides not to initiate or continue an electronic transaction after receiving the compressed risk assessment message, the method 400 ends. If the online service 108 decides to initiate or continue the electronic transaction after receiving the compressed risk assessment message, the method 400 proceeds to block 416.

Block 416 involves the online service 108 transmitting a transaction-related message (e.g., a rate quote) to the assessed entity. Continuing with the example above, a comparative rate quoting website can present the quote, decision data, or other transaction message to a customer or other assessed entity that access the comparative rate quoting website. The presented data can allow the customer or other entity to make a decision regarding entering into the transaction with the online service 108 (e.g., offering to buy insurance at the quoted price).

The method 400 can also involve an assessed entity determining whether to enter the electronic transaction after receiving the transaction message, as depicted in block 418. For instance, the end-user website 401 can receive one or more user inputs from a computing device associated with the entity. The received user inputs can indicate whether the entity has decided to enter the electronic transaction. For instance, if an entity rejects an insurance rate quote provided via a comparative rate quote website or other suitable end-user website 401, the comparative rate quote website or other suitable end-user website 401 can receive one or more user inputs indicating that the entity has rejected the transaction, and the method 400 can end. if an entity accepts an insurance rate quote provided via a comparative rate quote website or other suitable end-user website 401, the comparative rate quote website or other suitable end-user website 401 can receive one or more user inputs indicating that the entity has decided to enter the transaction or otherwise proceed with the transaction, and the method 400 can proceed to block 420.

The method 400 can also involve transmitting another function call to gateway service 112 that requests a detailed risk assessment, as depicted in block 420. For example, an online service 108 (e.g., one of the online services 108a, 108b) can be executed by one or more suitable processing devices to request a detailed risk assessment. The online service 108 can request the detailed risk assessment responsive to (or otherwise based on) receiving one or more user inputs via the end-user website 401 indicating that the assessed entity has decided to enter the transaction or otherwise proceed with the transaction.

Continuing with the example above, if the customer decides to purchase the service (e.g., an insurance service) at the quoted price, the online service 108 can request a detailed risk assessment (e.g., a full credit file with credit score and reason codes) from the risk assessment system 114. The detailed risk assessment can be used by the online service to verify that the initial quote was reasonable or to modify the quote.

In the examples described above, the compressed risk assessment message can lack information from the detailed risk assessment. For example, a detailed risk assessment can include reason codes. A reason code can indicate an impact of an attribute of the entity on a risk assessment generated by a risk assessment algorithm or other automated modeling algorithm. Regulatory requirements may require reason codes to be assigned to some or all attributes that are used in a risk assessment algorithm or other automated modeling algorithm. Regulatory requirements may require reason codes to be included in a detailed risk assessment. But the compressed risk assessment message can omit reason codes that would be included in a detailed risk assessment. Thus, if the compressed risk assessment message causes the online service 108 to forgo a transaction with an entity, the compressed risk assessment message can cause a reduction in unnecessary communication traffic (e.g., network traffic used to transmit a detailed risk assessment).

In another example, the compressed risk assessment message may lack certain information that would allow an online service 108 to perform adverse action reporting. For example, a detailed risk assessment may include a full credit file, with a credit score and reason codes, and can be used by an online service to verify one or more aspects of a transaction (e.g., a rate quote) and provide adverse action notification where required by the Fair Credit Reporting Act ("FCRA") or other legal or regulatory authority. But the compressed risk assessment message can omit reason codes or other information that would enable adverse action notifications under the FCRA or other relevant authority. Thus, if the compressed risk assessment message causes the online service 108 to forgo a transaction with an entity, the compressed risk assessment message can cause a reduction in unnecessary communication traffic that would be associated with adverse action reporting.

The online service 108 can identify an application programming interface used by the gateway service 112. The application programming interface used by the gateway service 112 can include one or more function calls for requesting a detailed risk assessment. The function call may require certain parameters. The online service 108 can generate the function call with parameter values indicating that the online service 108 requires a detailed risk assessment for the entity.

The method 400 can also involve preparing and transmitting the detailed risk assessment request, as depicted in block 422. For example, the gateway service 112 can be executed by one or more suitable processing devices to prepare and transmit the detailed risk assessment request. In some aspects, the gateway service 112 can identify an application programming interface used by the risk assessment application 116. The application programming interface used by the risk assessment application 116 can include one or more function calls for generating a detailed risk assessment. The function call may require certain parameters. The online service 108 can generate the function call with parameter values that cause the risk assessment application 116 to provide the detailed risk assessments.

The method 400 can also involve generating or otherwise obtaining a detailed risk assessment, as depicted in block 424. For example, the risk assessment application 116 can be executed by one or more suitable processors 202 to generate or otherwise the detailed risk assessment. The risk assessment application 116 can generate or otherwise obtain the detailed risk assessment as described above with respect to block 312 of FIG. 3. In some aspects, generating the detailed risk assessment can include executing a risk assessment algorithm using the entity data 120. In additional or alternative aspects, obtaining the detailed risk assessment can include retrieving a detailed risk assessment that was generated contemporaneously with the compressed risk assessment message at block 408.

The method 400 can also involve transmitting the detailed risk assessment to the online service 108, as depicted in block 426. The risk assessment application 116 can transmit the detailed risk assessment message to the gateway service 112, using operations similar to those described above with respect to block 314 of FIG. 3. The gateway service 112 can configure a network interface device of the gateway system 110 to transmit the detailed risk assessment to the external server that provides the online service 108. The online service 108 can receive, via a data network, one or more files that include the detailed risk assessment at block 428. The method 400 can then end.

Continuing with the rate-quoting example provided above, the risk assessment system 114 can receive a request from the external server system for a detailed risk assessment after transmitting the compressed risk assessment message. For instance, if an online service receives a request for goods or services from a customer via the comparative rate quoting website (e.g., because the customer has elected to purchase an insurance policy at a quoted price), the online service can transmit a request for a detailed risk assessment (e.g., a credit report) to the risk assessment system 114.

In some aspects, the risk assessment system 114 can generate a detailed risk assessment by executing one or more algorithms for obtaining a credit report, which is based on the same credit data used to generate a rank, grade, or other compressed risk assessment message. The risk assessment system 114 can access one or more data sources that include data about the customer that may be used to generate a detailed risk assessment, such as credit-related data that can be used to generate a credit report. The risk assessment system 114 can generate the detailed risk assessment using the accessed data. The data sources used to generate the detailed risk assessment can include at least some of the same data sources that were used to generate the compressed risk assessment message. The risk assessment system 114 can transmit the detailed risk assessment over one or more data networks 104a, 104b to the online service 108 via the gateway service 112 or another suitable network.

In some aspects, the risk assessment system 114 can store data in a non-transitory computer-readable medium indicating that the detailed risk assessment was generated for the customer. For example, the risk assessment system 114 can store a record of a regular credit inquiry (e.g., a request for a credit report) to the customer's credit file with the name of the online service from which the inquiry was received. The record can be stored using the second flag or data described above with respect to FIG. 3.

In some aspects, the risk assessment system 114 can provide the compressed risk assessment message and the detailed risk assessment via separate communications in response to separate inquiries. Examples of separate inquiries include a first inquiry from an external server system prior to providing a quote to a customer and a second inquiry from the external server system after the customer has responded affirmatively to the quote. In some aspects, the risk assessment system 114 can transmit the detailed risk assessment (e.g., a credit report file) along with the compressed risk assessment message to a server in the gateway service 112. The server in the gateway service 112 may store the credit report file or other detailed risk assessment for a time period corresponding to a customer transaction between an online service and a customer.

The online service can retrieve the credit report file or other detailed risk assessment from the server of the gateway service 112 in addition to or instead of separately requesting the detailed risk assessment from the risk assessment system 114. For example, if an online service requires a detailed risk assessment after a customer expresses interest in a product or service, the online service can obtain the detailed risk assessment stored at the gateway service 112. If the gateway service 112 did not store the full credit report file, or if too much time has elapsed for it to be considered reliable, the gateway service 112 re-requests the full credit report file from the risk assessment system 114 if the comparative rate quoting website communicates the customer's decision to enter into a transaction.

Figure 5:
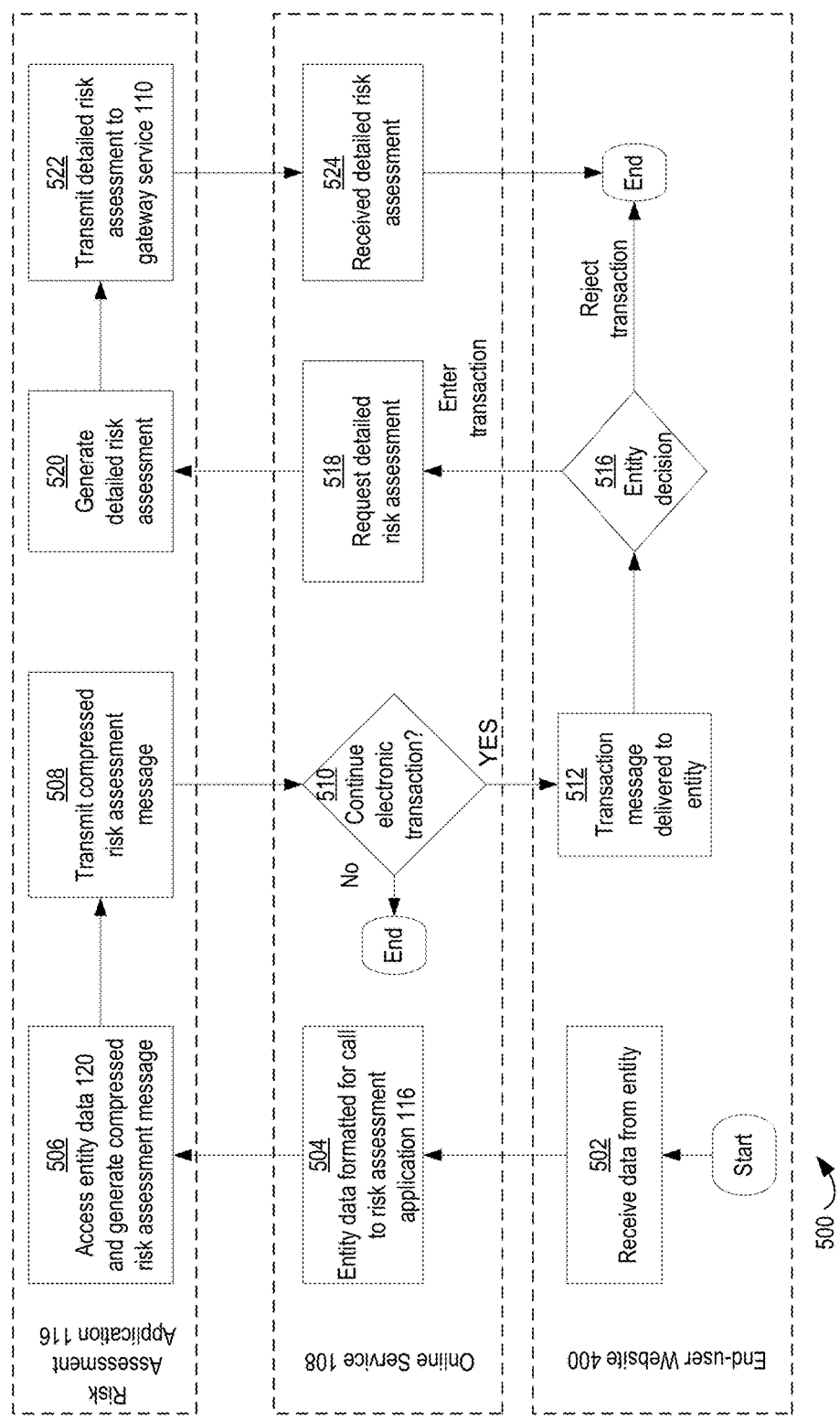
FIG. 5 depicts an example of an alternative method that uses various devices depicted in FIG. 1 for communicating compressed risk assessment messages and detailed risk assessments without using a gateway service, according to some aspects of the present disclosure.

In some aspects, the gateway service 112 can be omitted. For example, FIG. 5 is a flow chart depicting an example of a method 500 for operating various systems depicted in FIG. 1, but not the gateway system 110, when communicating compressed risk assessment messages and detailed risk assessments. For illustrative purposes, the method 500 is described with reference to the implementation depicted in FIGS. 1-4 and various other examples described herein. But other implementations are possible.

The method 500 can involve receiving data from the entity, as depicted in block 502. Block 502 can be implemented in a manner similar to block 402 of the method 400.

The method 500 can also involve formatting the received entity data for a function call to the risk assessment application 116, as depicted in block 504. For example, an online service 108 (e.g., one of the online services 108a, 108b) can be executed by one or more suitable processing devices to format the received entity data. Formatting the received entity data can include tokenizing, cleaning, encrypting, or otherwise converting the entity data from a format used by the end-user website 401 to a format used by the risk assessment application 116 or used to transmit the data to the risk assessment application 116.

In some aspects, the online service 108 can identify an application programming interface used by the risk assessment application 116. The application programming interface used by the risk assessment application 116 can include one or more function calls for requesting a compressed risk assessment. The function call may require certain parameters. The online service 108 can generate the function call with parameter values that include the received entity data or that include parameter values that are derived from the received entity data.

The method 500 can also involve accessing entity data 120 and generating compressed risk assessment message, as depicted in block 506. Block 506 can be implemented in a manner similar to block 408 of the method 400.

The method 500 can also involve transmitting the compressed risk assessment message to the online service 108, as depicted in block 508. Block 508 can be implemented in a manner similar to block 410 of the method 400.

The method 500 can also involve determining whether to initiate or continue an electronic transaction after receiving the compressed risk assessment message, as depicted in block 510. Block 510 can be implemented in a manner similar to block 414 of the method 400.

If the online service 108 decides not to initiate or continue an electronic transaction after receiving the compressed risk assessment message, the method 500 ends. If the online service 108 decides to initiate or continue an electronic transaction after receiving the compressed risk assessment message, the method 500 proceeds to block 512, which involves the online service 108 transmitting a transaction-related message (e.g., a rate quote) to the assessed entity. Block 512 can be implemented in a manner similar to block 416 of the method 400.

The method 500 can also involve an assessed entity determining whether to enter the electronic transaction after receiving the transaction message, as depicted in block 516. Block 516 can be implemented in a manner similar to block 418 of the method 400.

The method 500 can also involve transmitting another function call that requests a detailed risk assessment from the risk assessment application 116, as depicted in block 518. For example, an online service 108 (e.g., one of the online services 108a, 108b) can be executed by one or more suitable processing devices to request a detailed risk assessment. The online service 108 can request the detailed risk assessment responsive to or otherwise based on receiving one or more user inputs via the end-user website 401 indicating that the assessed entity has decided to enter the transaction or otherwise proceed with the transaction. The online service 108 can identify an application programming interface used by the risk assessment application 116. The application programming interface used by the risk assessment application 116 can include one or more function calls for requesting a detailed risk assessment. The function call may require certain parameters. The online service 108 can generate the function call with parameter values indicating that the online service 108 requires a detailed risk assessment for the entity.

The method 500 can also involve generating the detailed risk assessment request, as depicted in block 520. Block 520 can be implemented in a manner similar to block 424 of the method 400.

The method 500 can also involve transmitting the detailed risk assessment message to the online service 108, as depicted in block 522. Block 522 can be implemented in a manner similar to block 426 of the method 400. The risk assessment application 116 can transmit the detailed risk assessment message as described above with respect to block 314 of FIG. 3. The online service 108 can receive, via a data network, one or more files that include the detailed risk assessment at block 524. The method 500 can then end.

As described herein with respect to FIG. 1-5, a risk assessment system 114 can provide improvements over existing systems for assessing risks. In a simplified example, existing systems may not offer accurate, real-time assessments of the risk of entering into a transaction with a customer. A full credit report or other report indicating the risks associated with the consumer may not be desirable for an online service if the customer has not yet expressed interest in entering into a transaction. For example, analyzing a full credit report on every customer encountered by an insurance company or other online service may occupy the online service's time, thereby limiting the online service's ability to target a broad range of customers. Therefore, in existing systems, an online service may request a full credit report or other detailed risk assessment after a customer has expressed an interest in entering into a transaction (e.g., by affirmatively responding to an insurance quote by offering to purchase an insurance policy).

However, if the risk assessment is not sufficiently accurate, the online service may offer terms or conditions (e.g., a risk-based quote) that a customer perceives to be too low or too high, which reduces the likelihood of the customer doing business with the online service if the quoted amount changes.

Certain aspects of a risk assessment system 114 can provide compressed risk assessment messages to online services, where the compressed risk assessment messages are sufficiently concise and delivered sufficiently fast for a client entity to focus on productive customers. The compressed risk assessment messages, which can be generated from the same set of data used to generate a more extensive risk assessment (e.g., credit data used to generate a credit report), can have comparable accuracy to the more extensive risk assessment, which can increase the likelihood that a customer will enter into the transaction.

In some aspects, the risk assessment system 114 can address challenges unique to electronic commerce systems. For example, a customer who may be interested in a product or service may use a comparative rate quoting website that allows that user to contemporaneously obtain quotes from several providers. Comparative rate quoting websites introduce challenges that did not exist before the advent of the Internet, because customers were not able to request quotes from multiple insurance companies simultaneously. Previously, an insurance company had the opportunity to pre-qualify the customer and determine whether to order a full credit report based on the client's responses to pre-qualification questions or level of interest. The insurance company had the opportunity to ask questions that were important to its business model, such as how many accidents the customer had been in or what kind of car the customer drove. However, with comparative rate quoting websites, the insurance company is limited to questions asked by the comparative rate quoting website. Because multiple comparative rate quoting web sites compete against each other, the amount of pre-qualification performed for each potential customer can vary. Yet, the insurance company needs to provide a competitive quote if it will continue to be able to attract new customers.

Such a quote generated must also be generated quickly. Customers using electronic commerce systems expect a rapid response. A delay will deter them from doing business with the company that is slow to respond. Additionally, because multiple insurance companies are providing quotes through each comparative rate quoting website, the fastest quotes are most likely to catch the customer's attention. Therefore, insurance companies may race to provide an accurate quote to each customer.

The risk assessment system 114 addresses these problems by including a reasonably accurate compressed risk assessment message. The compressed risk assessment message uses the same pool of data as a credit report, providing confidence that the quote presented is appropriate according to the risk the customer presents. At the same time, the compressed risk assessment message is sufficiently concise that it facilitates quick responses from online services to customers in online forums. One or more automated processes performed by one or more computing devices of the risk assessment system 114 can provide the ability to generate and deliver the compressed risk assessment message with the required accuracy in real-time or near real-time. The ability to generate and deliver the compressed risk assessment message with the required accuracy in real-time or near real-time can in turn enable online comparative rate quoting services to provide information in an accurate and timely manner via the Internet.

General Considerations

Numerous specific details are set forth herein to provide a thorough understanding of the claimed subject matter. But those skilled in the art will understand that the claimed subject matter may be practiced without these specific details. Certain methods, apparatuses, or systems that would be known by one of ordinary skill have not been described in detail so as not to obscure claimed subject matter. Those skilled in the art, upon attaining an understanding of the foregoing, may produce alterations to, variations of, and equivalents to aspects described herein. Any aspects or examples may be combined with any other aspects or examples.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable program coding, scripting, or other type of language or combinations of languages may be used to implement the teachings contained herein in software to be used in programming or configuring a computing device. Though aspects of the methods disclosed herein may be performed in the operation of such computing devices, the order of the blocks in the examples can be varied (e.g., re-ordered, combined, broken into sub-blocks, performed in parallel, etc.).

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Accordingly, this disclosure has been presented for purposes of example rather than limitation, and does not preclude inclusion of modifications, variations, or additions to the present subject matter as would be readily apparent to one of ordinary skill in the art.

The invention claimed is:

1. A risk assessment system comprising:
   a hardware network interface device communicatively coupled, via a data network, to a plurality of external servers associated with a plurality of online services that is accessible by a plurality of entities, wherein the hardware network interface device is configured for receiving, from an external server of the plurality of external servers, a compressed risk assessment request and a detailed risk assessment request regarding an entity from the plurality of entities; and
   a non-transitory computer-readable medium that stores a data structure having entity data describing transactions involving the plurality of entities;
   a hardware processor communicatively coupled to the hardware network interface device and the non-transitory computer-readable medium, wherein the hardware processor is configured for:
      determining that the compressed risk assessment request is requesting a compressed risk assessment message, wherein the compressed risk assessment message indicates a risk associated with the entity using less data than a detailed risk assessment generated by the risk assessment system, wherein the detailed risk assessment includes an explanation of a determination of the risk,
      performing a common execution of a risk assessment algorithm, with at least some of the entity data as inputs, that outputs the compressed risk assessment message and a detailed risk assessment,
      storing, in the non-transitory computer-readable medium, the detailed risk assessment generated by the common execution of the risk assessment algorithm,
      excluding the detailed risk assessment from a responsive message to be transmitted by the risk assessment system in response to the compressed risk assessment request, wherein the responsive message includes the compressed risk assessment message,
      causing the hardware network interface device to transmit the responsive message having compressed risk assessment message,
      subsequent to transmitting the compressed risk assessment message:
         determining that the detailed risk assessment request has been received,
         retrieving, after a receipt of the detailed risk assessment request, the detailed risk assessment from the non-transitory computer-readable medium, and
         causing the hardware network interface device to transmit the detailed risk assessment.

2. The risk assessment system of claim 1, wherein the hardware processor is configured for performing the common execution of the risk assessment algorithm and causing the hardware network interface device to transmit the compressed risk assessment message in real time.

3. The risk assessment system of claim 2, wherein the hardware processor is configured for performing the common execution of the risk assessment algorithm and causing the hardware network interface device to transmit the compressed risk assessment message in real time by performing the common execution of the risk assessment algorithm and causing the hardware network interface device to transmit the compressed risk assessment message prior to an expiration of a session between (i) an online service associated with the external server and (ii) a computing device associated with the entity, wherein the hardware network interface device is configured for receiving the compressed risk assessment request during the session.

4. The risk assessment system of claim 1, wherein the risk assessment system is communicatively coupled to the plurality of external servers via a gateway system.

5. The risk assessment system of claim 1, wherein the compressed risk assessment message includes one or more of a numerical score, a letter grade, a suggested operation corresponding to a certain risk level, or a color indicator.

6. The risk assessment system of claim 1, wherein the entity data comprises a first flag indicative of receiving the compressed risk assessment request for the entity and a second flag indicative of receiving the detailed risk assessment request for the entity,
wherein the hardware processor is further configured for:
receiving, from a remote system, a query requesting information about risk assessment requests for the entity,
generating a response to the query, wherein the first flag is excluded from the response and the second flag is included in the response, and
causing the hardware network interface device to transmit the response.

7. A computer-implemented method comprising:
receiving, by a processing device of a risk assessment system from external servers respectively associated with online services, compressed risk assessment requests regarding respective entities; and
performing, by the processing device and for each compressed risk assessment request received by the risk assessment system, operations comprising:
determining that the compressed risk assessment request is requesting a compressed risk assessment message, wherein the compressed risk assessment message indicates a risk associated with an entity using less data than a detailed risk assessment generated by the risk assessment system, wherein the detailed risk assessment includes an explanation of a determination of the risk, and
generating the compressed risk assessment message by executing a risk assessment algorithm that uses, as input, respective entity data describing a respective one of the entities;
transmitting, via a data network, the compressed risk assessment messages to the external servers;
receiving, subsequent to transmitting the compressed risk assessment messages, detailed risk assessment requests for a subset of the entities for which the compressed risk assessment messages were generated;
generating, by the processing device, detailed risk assessments, wherein each detailed risk assessment is generated by executing the risk assessment algorithm;
transmitting, via the data network and in response to receiving the detailed risk assessment requests for the subset of the entities, the detailed risk assessments; and
for at least one compressed risk assessment request from the compressed risk assessment requests and at least one detailed risk assessment request from the detailed risk assessment requests:
generating at least one compressed risk assessment message and at least one detailed risk assessment corresponding to the at least one compressed risk assessment message via a common execution of the risk assessment algorithm,
storing, in a non-transitory computer-readable medium, the at least one detailed risk assessment generated by the common execution of the risk assessment algorithm,
generating a responsive message that excludes the at least one detailed risk assessment and includes the at least one compressed risk assessment message, wherein transmitting the at least one compressed risk assessment message comprises transmitting the responsive message,
retrieving, from the non-transitory computer-readable medium, the at least one detailed risk assessment after receiving a detailed risk assessment request, and
transmitting the at least one detailed risk assessment that is retrieved from the non-transitory computer-readable medium.

8. The method of claim 7, wherein each compressed risk assessment message is generated and transmitted in real time.

9. The method of claim 8, wherein generating and transmitting one or more of the compressed risk assessment messages in real time comprises generating and transmitting, responsive to one or more of the compressed risk assessment requests, the compressed risk assessment message prior to an expiration of a session between (i) an online service associated with one of the external servers and (ii) a computing device associated with a respective entity for which the compressed risk assessment message is generated, wherein the one or more of the compressed risk assessment requests is received during the session.

10. The method of claim 7, wherein the risk assessment system communicates with the external servers via a gateway system.

11. The method of claim 7, wherein each compressed risk assessment message includes one or more of a numerical score, a letter grade, a suggested operation corresponding to a certain risk level, or a color indicator.

12. The method of claim 7, wherein entity data for the entity comprises a first flag indicative of receiving one of the compressed risk assessment requests for the entity and a second flag indicative of receiving one of the detailed risk assessment requests for the entity,
wherein the method further comprises:
receiving, from a remote system via the data network, a query requesting information about risk assessment requests for the entity,
generating a response to the query, wherein the first flag is excluded from the response and the second flag is included in the response, and
transmitting the response to the remote system via the data network.

13. A non-transitory computer-readable medium having program code that is executable by a processing device of a risk assessment system to cause the risk assessment system to perform operations, the operations comprising:
receiving, from external servers respectively associated with online services, compressed risk assessment requests regarding respective entities and generating compressed risk assessment messages; and
for each compressed risk assessment request received by the risk assessment system:
determining that the compressed risk assessment request is requesting a respective compressed risk assessment message, wherein the compressed risk assessment message indicates a risk associated with an entity using less data than a detailed risk assessment generated by the risk assessment system, wherein the detailed risk assessment includes an explanation of a determination of the risk, and generating the respective compressed risk assessment message by executing a risk assessment algorithm that uses, as input, respective entity data describing a respective one of the entities;

transmitting, via a data network, the compressed risk assessment messages to the external servers;

receiving, subsequent to transmitting the compressed risk assessment messages, detailed risk assessment requests for a subset of the entities for which the compressed risk assessment messages were generated;

generating detailed risk assessments, wherein each detailed risk assessment is generated by executing the risk assessment algorithm;

transmitting, via the data network and in response to receiving the detailed risk assessment requests for the subset of the entities, the detailed risk assessments; and for at least one compressed risk assessment request from the compressed risk assessment requests and at least one detailed risk assessment request from the detailed risk assessment requests:

generating at least one compressed risk assessment message and at least one detailed risk assessment corresponding to the at least one compressed risk assessment message via a common execution of the risk assessment algorithm, storing, in the non-transitory computer-readable medium or another non-transitory computer-readable medium, the at least one detailed risk assessment generated by the common execution of the risk assessment algorithm, generating a responsive message that excludes the at least one detailed risk assessment and includes the at least one compressed risk assessment message, wherein transmitting the at least one compressed risk assessment message comprises transmitting the responsive message, retrieving, from the non-transitory computer-readable medium, the at least one detailed risk assessment after receiving a detailed risk assessment request, and transmitting the at least one detailed risk assessment that is retrieved from the non-transitory computer-readable medium.

14. The non-transitory computer-readable medium of claim 13, wherein each compressed risk assessment message is generated and transmitted in real time.

15. The non-transitory computer-readable medium of claim 14, wherein generating and transmitting one or more of the compressed risk assessment messages in real time comprises generating and transmitting, responsive to one or more of the compressed risk assessment requests, the compressed risk assessment message prior to an expiration of a session between (i) an online service associated with one of the external servers and (ii) a computing device associated with a respective entity for which the compressed risk assessment message is generated.

16. The non-transitory computer-readable medium of claim 15, wherein each compressed risk assessment message includes one or more of a numerical score, a letter grade, a suggested operation corresponding to a certain risk level, or a color indicator.

17. The non-transitory computer-readable medium of claim 13, wherein entity data for the entity comprises a first flag indicative of receiving one of the compressed risk assessment requests for the entity and a second flag indicative of receiving one of the detailed risk assessment requests for the entity, wherein the operations further comprise:

receiving, from a remote system via the data network, a query requesting information about risk assessment requests for the entity, generating a response to the query, wherein the first flag is excluded from the response and the second flag is included in the response, and transmitting the response to the remote system via the data network.

* * * * *

UNITED STATES PATENT AND TRADEMARK OFFICE
CERTIFICATE OF CORRECTION

PATENT NO. : 10,178,111 B1
APPLICATION NO. : 15/275868
DATED : January 8, 2019
INVENTOR(S) : John Wilson et al.

Page 1 of 1

It is certified that error appears in the above-identified patent and that said Letters Patent is hereby corrected as shown below:

In the Specification

In Column 17, Line 63, delete "end." and insert -- end, --, therefor.

In Column 21, Line 66, delete "FIG." and insert -- FIGS. --, therefor.

Signed and Sealed this
Twenty-sixth Day of March, 2019

Andrei Iancu
*Director of the United States Patent and Trademark Office*